United States Patent

[11] 3,617,612

| [72] | Inventor | George Allen Patton<br>Pfafftown, N.C. |
|---|---|---|
| [21] | Appl. No. | 14,130 |
| [22] | Filed | Feb. 25, 1970 |
| [45] | Patented | Nov. 2, 1971 |
| [73] | Assignee | AMP Incorporated<br>Harrisburg, Pa. |

[54] ELECTRICAL JUNCTION MEANS
4 Claims, 4 Drawing Figs.

[52] U.S. Cl. .................................................. 174/59,
174/65 R, 317/122
[51] Int. Cl. ............................................... H02g 3/08
[50] Field of Search .......................... 174/59, 60,
65 R, 92; 339/198 R, 198 E, 198 G, 198 GA, 198
J; 317/122

[56] References Cited
UNITED STATES PATENTS
1,148,699  8/1915  McWilliams ................. 174/59

| 2,219,887 | 10/1940 | Bowley et al. ................ | 317/122 X |
| 3,033,913 | 5/1962 | Dietze ........................... | 174/60 |
| 3,260,793 | 7/1966 | Edelman ....................... | 317/122 X |

Primary Examiner—Lewis H. Myers
Assistant Examiner—D. A. Tone
Attorneys—Curtis, Morris and Safford, William J. Keating, Frederick W. Raring, Jay L. Seitchik, Ronald D. Grefe and John P. Vandenburg ABSTRACT: Electrical junction means comprises hollow box of insulating material having parallel relatively thick sidewalls, end walls, and cover. A plurality of terminal members are mounted on the sidewalls which are adapted to receive the conductors of cables extending through the end walls to the interior of the box. Cables are clamped by means of separate cable clamp which fits into the end walls and holds the cables between edge surfaces of the end walls and edge surfaces of the clamp.

3,617,612

ELECTRICAL JUNCTION MEANS

BACKGROUND OF THE INVENTION

This invention relates to electrical junction systems for forming interconnections among a plurality of conductors contained in a plurality of cables. The herein disclosed embodiment of the invention is particularly intended for use in the telephone industry although the invention is amenable to other uses.

When the telephone wiring is being installed in a building, or when additional wiring is being installed in an older building, it is frequently necessary to interconnect the conductors of a plurality of relatively small size cables. The present invention is directed to the achievement of an improved junction means for such cables having the advantages of compactness or small size so that it can be installed in confined areas, the capacity to form interconnections among a relatively large number of conductors, ease of servicing and installation, and other advantages not generally available in presently used junction systems.

It is accordingly an object of the invention to provide an improved junction and interconnection system for electrical conductors. A further object is to provide a compact and lightweight junction system which can be installed in confined places. A still further object is to provide a junction box for electrical conductors capable of receiving varying numbers of electrical cables each containing a plurality of conductors.

These and other objects of the invention are achieved in a preferred embodiment thereof which is briefly described in the foregoing abstract, which is described in detail in hereinbelow, and which is shown in the accompanying drawings in which.

Figure 1:
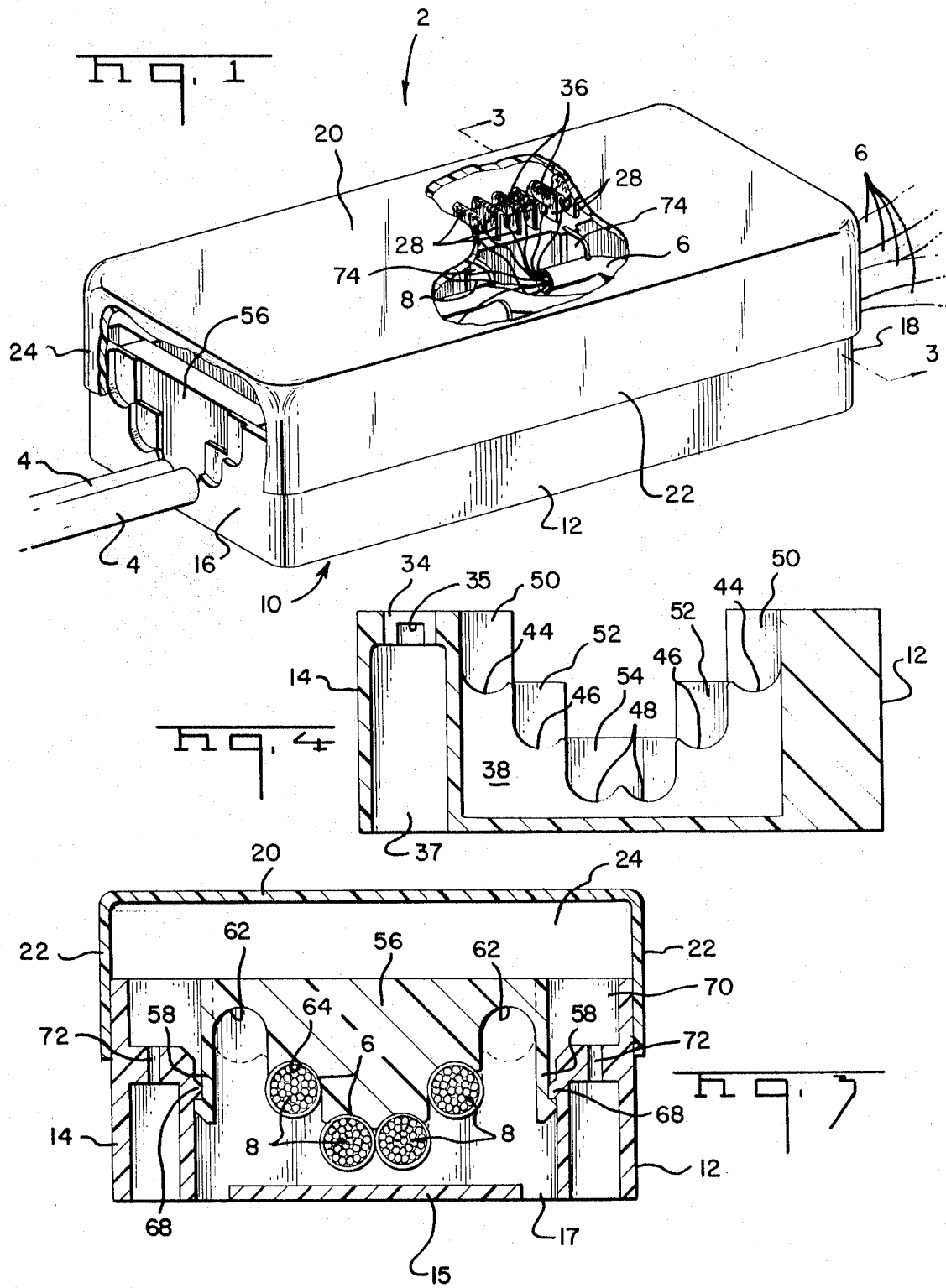
FIG. 1 is a perspective view, with parts broken away, of a preferred form of electrical junction box in accordance with the invention.

FIGS. 3 and 4 are views taken along the lines 3—3 and 4—4 of FIG. 1.

An electrical junction box assembly 2 in accordance with the invention is adapted to receive cables 4, 6 at its opposite ends and form interconnections among the conductors 8 of the cable. Cables of the type commonly used for internal building wiring in the telephone industry contain about 25 pairs of conductors so that interconnections must be provided where six cables extend to a junction area as in the disclosed embodiment for about 300 conductors.

Figure 2:
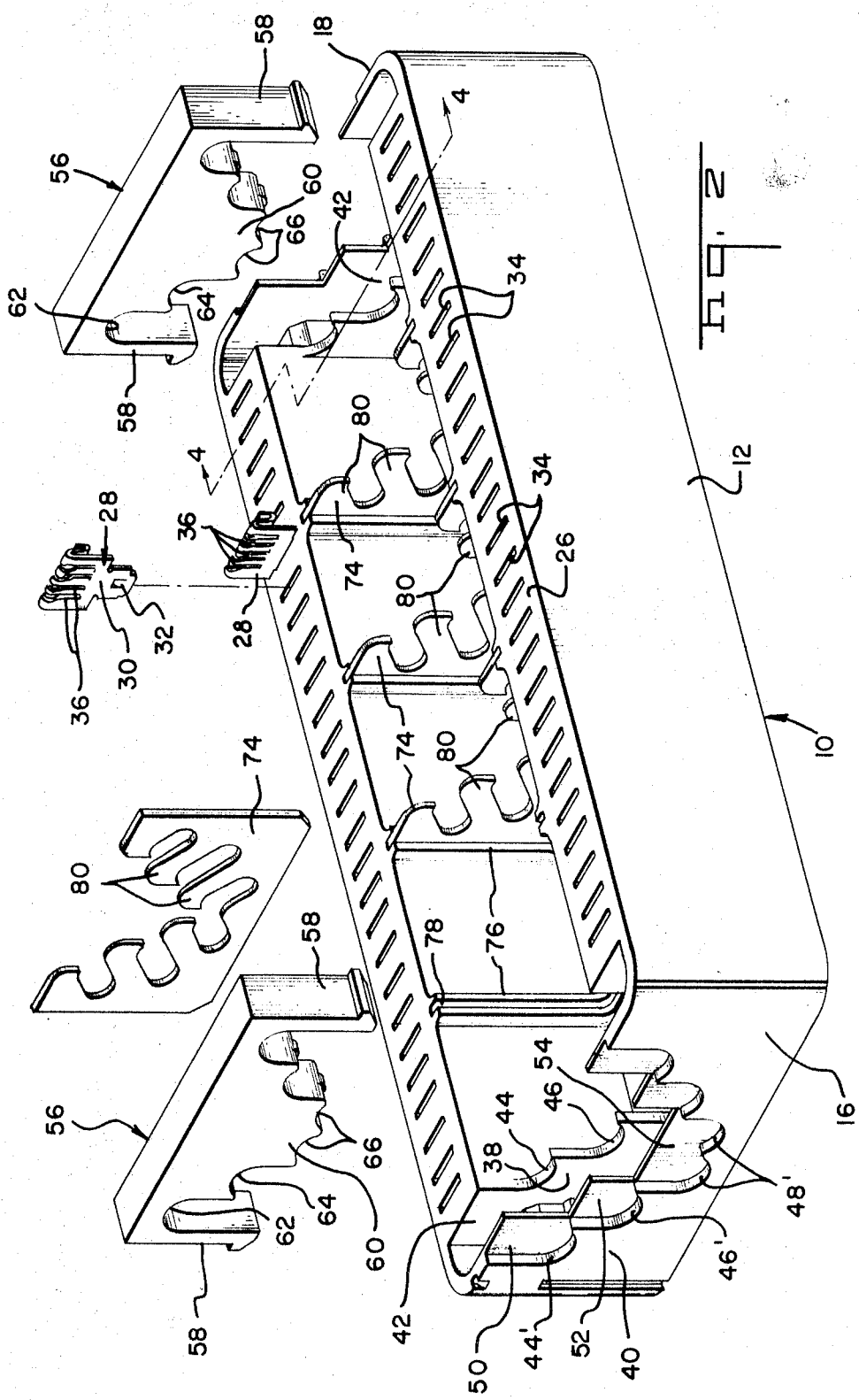
FIG. 2 is a perspective view, with some parts exploded, of the base portion of the block or box in accordance with the invention.

Referring to FIG. 2, the junction box assembly comprises a box 10 having rectangular space-apart sidewalls 12, 14, end walls 16, 18, and a base 15 in which openings 17 may be provided for fasteners so that the junction box may be secured to a panel. A cover 20 is provided which has depending skirts 22, 24 that extend partially downwardly over the sidewalls and end walls in the completed assembly. Advantageously, detent means (not specifically shown) are provided on the skirts and the walls of the box portion 10 to secure the cover in place and to prevent the accidental removal thereof.

The sidewalls 12, 14 are relatively thick and have upper surfaces 26 in which rows of terminals 28 are mounted. Each terminal 28 has a generally rectangular mounting portion 30 extending from its lower end in which there is provided a lance 32. The terminals are inserted into rectangular openings 34 which extend downwardly from the surfaces 26 of the sidewalls so that the lances can lodge against downwardly facing shoulders 35 in the openings 34. As shown in FIG. 4, the openings 34 communicate with larger openings 37 in the sidewalls which are formed by the mold core pins when the box portion 10 is molded. The individual terminals 28 comprise formed sheet metal plates having downwardly extending slots 36 which are adapted to receive insulated wires, the width of these slots being such that the insulation of the wires is penetrated and electrical contact is established between the edges of the slots and the conducting cores of the wires. Terminals of this type are more fully disclosed and described in my copending application, Ser. No. 805,160 filed Mar. 7, 1969. When it is desired to connect an individual wire to one of the terminals, it is merely necessary to position the wire in the upper portion of one of the slots 36 and push the wire downwardly by means of an insertion tool which may be of the general type disclosed in my aforementioned copending application.

Recesses 42 extend downwardly into the end walls 16, 18 to define a pair of spaced-apart parallel panels 38, 40. The upper edges of these panels are inclined downwardly on each side and shaped to provide a plurality of side-by-side pockets 44, 46, 48 in the panels 38 and 44', 46', 48' in the panels 40 at different elevations above the base of the junction box. The radii of these arcuate surfaces are substantially equal to the radii of the cables which are being interconnected. It will be noted that the arcuate surfaces are on the same level in the two panels 38, 40 so that the cable will be supported on surface portions of both panels. Removable thin panel sections 50, 52, 54 are provided adjacent to the upper edge of the panel section 40 so that these sections will effectively close the end walls when they are in position but, when removed, will form an opening to permit entry of a cable.

The cables extending into the end walls are clamped by means of a clamping member 56 having depending arms 58 on its ends and a central depending section 60 which is symmetrical about its vertical center line and which has arcuate surfaces 62, 64, 66 which are in alignment with the arcuate surfaces of the panels 38, 40. The clamping members 56 are secured in position after they are inserted into the recesses between panels 38, 42 of the end walls by means of upwardly facing shoulders on the lower ends of the arms 58 which interengage with downwardly facing shoulders 68 on the sides of the recess.

As an alternative to the use of the interengaging shoulders for holding the clamping member 56 in the recesses, laterally extending ears may be provided on the sides of the clamping members 56 which are adapted to extend into side portions 70 of the recesses. These ears can be provided with openings for self-taping screws which are adapted to enter screw holes 72 in the sidewalls.

A plurality of wire dressing or wire guiding plates 74 are mounted in the interior of the box portion of the junction system between the opposed surfaces of the sidewalls 12, 14 by means of ribs 76 on the sidewalls having downwardly extending grooves 78 which are adapted to receive plates. The plates have inwardly extending fingers 80 which define slots for reception of the wires. The wires can thus be guided to particular terminals on upper surfaces 26 of the sidewalls by laying them in appropriate slots between fingers 80 in the wire dressing plates.

When a junction box in accordance with the invention is installed, some of the thin panel sections 50, 52, 54 in the end walls 16, 18 are removed. In FIG. 1, the thin panel section 54 has been removed to permit the entry of two cables in the lower portion of the end wall while the panel sections 52, 54 have been removed from the end wall 18 to permit the entry of 4 cables. After the cables have been led into the box and the outer insulation sheaths have been removed, the necessary interconnections are made by dressing the wires through the wire guide means 74 and inserting the appropriate wires into the appropriate terminals 28 as indicated in FIG. 1. Thereafter the cover is assembled to the base portion of the junction box to prevent the entry of dust or dirt into its interior.

It is believed that some of the principal advantages of the invention will be apparent from the foregoing detailed description. Junction boxes in accordance with the invention are relatively compact and have a high capacity as regards numbers of electrical connections. For example, one size of junction box in accordance with the invention has the length of 9 inches, a width of 4 1⅛, and a height of only, 2 1¼ and is capable of accommodating up to 150 pairs of conductors. The cables can be led into the box from either end by removing the appropriate removable panels 50, 52, 54 and can be neatly dressed with the aid of the guide 74 to the terminals to which they are to be connected. The strain relief 56 firmly clamps each cable at its point of entry into the junction box so that no tensile stresses are transmitted to the wires which might interfere with the electrical connections between the wires and the terminals. A high degree of servicability is achieved in junction boxes in accordance with the invention in that to change the interconnections among a group of cables or to add a new cable to the junction system, it is only necessary to remove the cover 20 and (where a new cable is being added) remove one of the clamping members 56. Since the terminals are provided on the upper surfaces 26 of the sidewalls, they are readily accessible for any rewiring which is being carried out.

I claim:

1. Interconnection and junction means for a multiplicity of conductors extending to a common location, said conductors being contained in a plurality of multiconductor cables, said interconnection and junction means comprising:

a junction box of insulating material having parallel opposed sidewalls, a base, transversely extending end walls, and an open top, a row of contact electrical terminals mounted on at least one of said sidewalls each of said terminals being adapted to receive a plurality of wires to connect said wires to each other, each of said end walls having opening means therein to admit said cables to the interior of said box, clamping means removably mounted on said end walls and engageable with said cables to clamp said cables and provide strain relief therefor, guide means on the opposed faces of said sidewalls for dressing said wires and guiding said wires towards said terminals, and cover means mounted on said junction box in covering relationship to said sidewalls.

2. Junction means as set forth in claim 1 wherein said contact terminals are mounted on upwardly facing surface portions of said sidewalls.

3. Junction means as set forth in claim 1 wherein said opening means in each of said end walls extends downwardly from the upper edge of the sidewall, said clamping means comprising a U-shaped clamping plate having a central projection intermediate its sides, said projection being complementary to said opening means whereby a cable may be clamped between said projection and edge portions of said opening means upon assembly of said clamping member to said junction box.

4. Junction means as set forth in claim 3 wherein each of said end walls has a plurality of removable panel sections along edge portions of said opening means, said removable panel sections and said projection normally closing said end wall, and upon removal of one of said panel sections, an opening is provided for a cable.

* * * * *